United States Patent

Marshall

[15] 3,688,022

[45] Aug. 29, 1972

[54] CROSSTALK REDUCTION IN COLOR REPRODUCTION SYSTEM

[72] Inventor: Daniel J. Marshall, San Pedro, Calif.

[73] Assignee: The Magnovox Company, Torrance, Calif.

[22] Filed: April 22, 1971

[21] Appl. No.: 136,502

[52] U.S. Cl. ............................................178/5.4 ST

[51] Int. Cl. ............................................H04n 9/06

[58] Field of Search ..........178/5.4 R, 5.4 ST, 5.4 CD

[56] References Cited

UNITED STATES PATENTS

| | | | |
|---|---|---|---|
| 3,524,014 | 8/1970 | Watanabe | 178/5.4 ST |
| 3,585,286 | 6/1971 | Macovski | 178/5.4 ST |

FOREIGN PATENTS OR APPLICATIONS

| | | | |
|---|---|---|---|
| 30,805 | 3/1970 | Japan | 178/5.4 ST |

*Primary Examiner*—Robert L. Richardson
*Attorney*—Smyth, Roston & Pavitt

[57] ABSTRACT

An improvement in a system for reproducing a color image where the composite black-and-white image is formed either on an exposure or is formed from a live image. In either case, modulations are provided in first and second particular line patterns to obtain representations of first and second particular colors. The third color may be unmodulated or modulations may also be provided in a third particular line pattern different from the first and second particular line patterns to obtain a representation of the third particular color. The three colors add optically to form the image luminance.

To reproduce the color image, signals are provided by scanning the composite image. Means are provided for operating upon such signals in accordance with the modulations in the first and second particular line patterns and the third particular line pattern if such is provided or the unmodulated signal if such is provided to produce signals representing the first, second and third particular colors. A tapped delay line is used to average the demodulation of the colors over several cycles of the line pattern to reduce luminance/chrominance crosstalk and associated beat frequencies. The demodulated signals are then used to reproduce the color image.

23 Claims, 10 Drawing Figures

INVENTOR.
Daniel J. Marshall
By Smyth, Roston & Pavitt
ATTORNEYS

INVENTOR:
Daniel J. Marshall

By Smyth, Roston & Pavitt

ATTORNEYS

INVENTOR:
Daniel J. Marshall
By Smyth, Roston & Pavitt
ATTORNEYS

CROSSTALK REDUCTION IN COLOR REPRODUCTION SYSTEM

This invention relates to a system for reproducing a color image from a composite black-and-white image. The invention is particularly adapted to be used in recording the color image on a monochrome medium and in reproducing the color image from the monochrome medium. Specifically, the invention relates to an improvement in the systems shown and described in U.S. application, Ser. No. 831,029 filed June 6, 1969, and now U.S. Pat. No. 3,647,943, in the name of Alfred M. Nelson and Daniel J. Marshall and in U.S. application, Ser. No. 89,339 filed Nov. 13, 1970, in the name of Bernard J. Okey and Daniel J. Marshall, both applications assigned to the same assignee as the instant application.

Various attempts have been made to convert a color image into black-and-white representations and to reproduce the color image from the black-and-white representations. These attempts have been made because black-and-white representations are not as expensive as color representations. For example, black-and-white representations are approximately one-third the cost of color representations. Furthermore, color video cameras are quite expensive and complex. Generally the color video cameras constitute a plurality of camera tubes in a single complex package. Because of this, it would be desirable to provide a simplified video camera which would provide color information from a single camera tube.

The inventions described in the above referred to applications provide a system for, and method of, recording color information on a black-and-white film and for subsequently reproducing the color information from the black-and-white film. The systems record a first color such as blue on the film while modulating the color in a first particular line pattern. The system further records a second color such as red on the film while modulating the color in a second particular line pattern having a different orientation than the first particular line pattern. The system of application, Ser. No. 831,029 also records a third color such as green on the film without any modulations. The system of application, Ser. No. 89,339 records the third color such as green on the film while modulating the color in a third particular line pattern having a different orientation than the first and second particular line patterns. The three recordings add optically to form a composite black-and-white image on the film.

To reproduce the color information from the black-and-white film, signals are produced to represent the composite by scanning the black-and-white image on the film. The signals representing the composite image are processed to produce the signals representing the luminance in the color image. The signals representing the composite image are also processed to recover the signals representing the first color, such as blue, in accordance with the modulations in the first line pattern. The signals are further processed to recover the signals representing the second color, such as red, in accordance with the modulations in the second line pattern. In the system of application, Ser. No. 831,029, the signals representing the first and second line patterns in conjunction with the luminance signal are then processed to reproduce the signals representing the third color, such as green. In the system of application, Ser. No. 831,029, the signals are still further processed to recover the signals representing the third color, such as green, in accordance with the modulations in the third line pattern. The signals representing the luminance of the color image and the signals representing the first, second and third colors are combined to obtain a reproduction of the color image.

In the particular embodiment of the invention described, scanning of the lines in the first pattern cause signals to be produced at the same frequency as scanning of the lines in the second pattern. However, the signals produced by the lines in the first pattern have a first phase relationship in pairs of successive horizontal scan lines on the composite image. The signals produced by the scan lines in the second pattern have a second phase relationship in successive horizontal scan lines on the composite image relative to the first phase relationship. When the signals in the successive scan lines are processed using a delay line equal to one horizontal line, the signals in one line are added to the signals in the adjacent line to recover the signals representing the first color. Similarly, the signals in one line are subtracted from the signals in the adjacent line to recover the signals representing the second color. The signals representing the first and second colors are then processed in a manner similar to that described above to obtain a reproduction of the color image.

In the improved system of the present invention, the level of luminance/chrominance crosstalk and associated beat frequencies in television cameras utilizing the optical modulation of colors is substantially reduced. The single frequency color coding method described in the above referenced applications, and specifically when using an equal angle relationship for the color grating, luminance transients may be induced in the chrominance channels. These transients may produce a serrated edge in the chrominance channel following an edge in the luminance channel and is mose noticeable after a black-to-white transition.

The reduction of luminance/chrominance crosstalk is accomplished by averaging the demodulation of the colors over several cycles of the color grating. The averaging may be accomplished using a tapped delay line (e.g., tapped at one cycle intervals) and summing the output of the tapped delay line with the signals from the output of the delay line of one horizontal line.

The description above has proceeded on the basis of the production of a composite image on black-and-white film. It will be appreciated that the systems and methods constituting this invention may also be used with a color camera to produce signals representing a composite image so that the signals may be transmitted, as in a closed circuit, to a color television receiver. When an image is viewed live by a camera, filters are provided in the camera to provide line patterns similar to those described above. For example, filter lines in a first pattern may subtract blue from the color and filter lines in a second pattern may subtract red from the color.

Figures 1, 2, 3, 5, 6, 7, 8, 9:
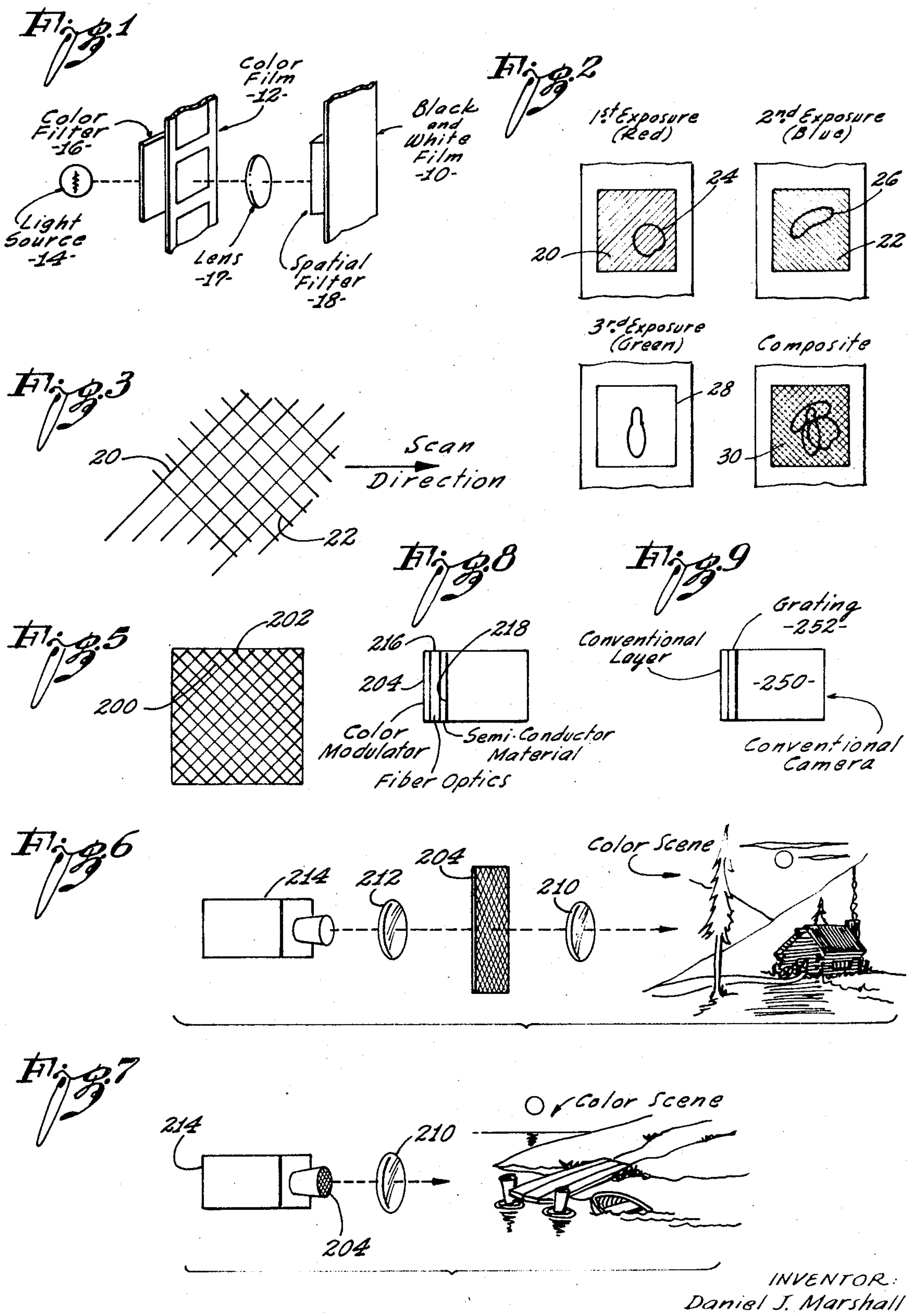
FIG. 1 is a schematic diagram of a system constituting this invention for converting a color image to a composite image on a black-and-white film.
FIG. 2 is a schematic representation of each of a plurality of images superimposed on the black-and-white film in the embodiment shown in FIG. 1 to form the composite image.
FIG. 3 is an enlarged schematic representation of gratings used in the embodiment shown in FIG. 1 and 2 to produce the individual images shown in FIG. 2.
Figure 4A:
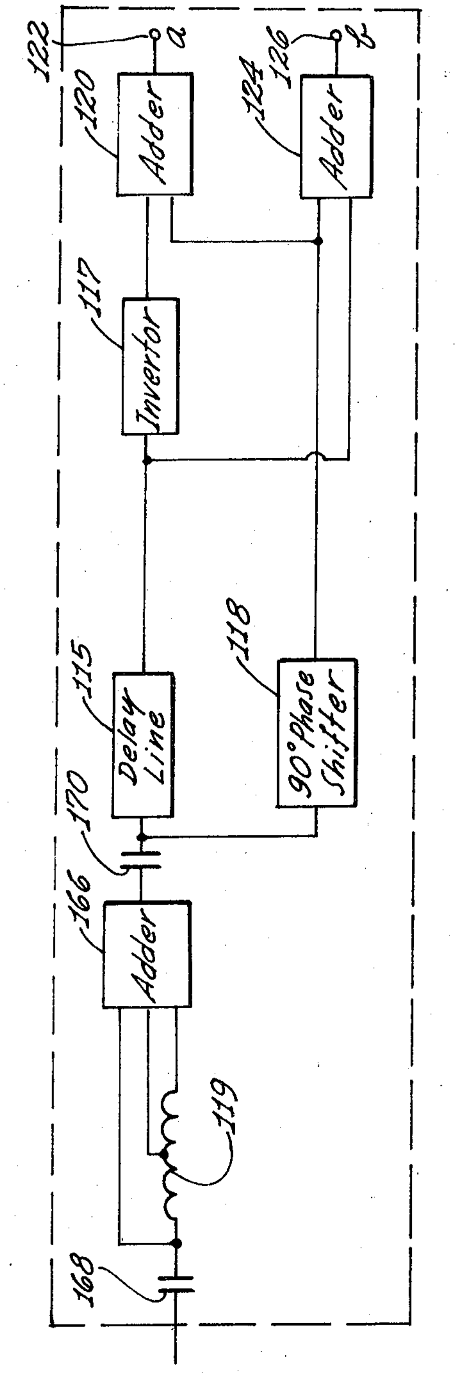
FIG. 4 is a diagram of the electrical circuitry which may be used to reproduce the color image from the composite image shown in FIG. 2.
Figure 4:
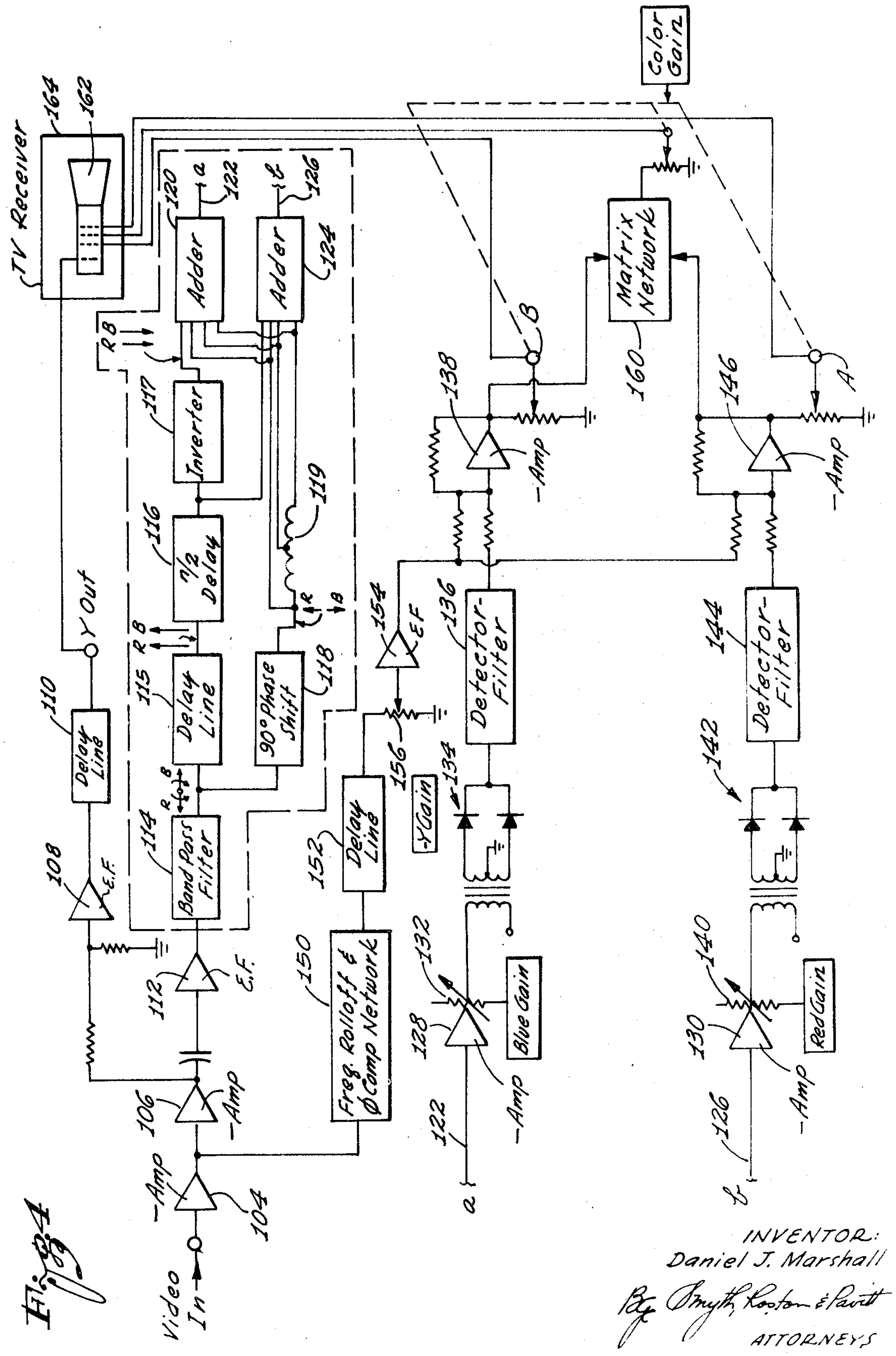

FIG. 4*a* is a diagram of alternate circuitry to the portion of the electrical circuitry of FIG. 4 shown in dotted lines;

FIG. 5 is an enlarged schematic representation of gratings used to produce individual images representing different colors when a live scene is being scanned;

FIG. 6 is a schematic diagram of a system constituting this invention for operating in conjunction with the grating shown in FIG. 5 to produce signals representing the color image;

FIG. 7 is a schematic diagram of a modification of the system shown in FIG. 6;

FIG. 8 is an enlarged fragmentary illustration of the tube used in the modification shown in FIG. 7 and further illustrates layers added on the face of the tube to make the tube adaptable to the system shown in FIG. 7; and FIG. 9 illustrates a camera modified to take the composite images shown in FIGS. 2 and 5.

In one embodiment of the invention, a composite image is produced on a black-on-white film generally indicated at 10 in FIG. 1 from a color film generally indicated at 12. The image may be formed by shining light from a source 14 through a color filter 16 and the film 12 to the black-and-white film 10. A filter 18 is disposed between the color film 12 and the black-and-white film 10. A lens 17 may also be provided for focusing the image from the color film 12 on the black-and-white film 10.

The black-and-white film 10 is exposed several different times to receive the image representing different colors. For example, a first exposure may be provided when the spatial filter 18 modulates the light passed by a blue filter 16. A second exposure may be provided when the spatial filter 18 modulates the light passed by a red color filter 16. similarly, a third exposure may be provided when the color filter 16 has characteristics to pass only green light.

It is desirable to balance the exposures made by the three color components to produce an overall luminance which is represented by the equation indicated below. This approximates the luminance response of the human eye. This equation is accepted as follows as a standard in the television field:

$$Y = 0.587G + 0.299R + 0.114B, \text{ where}$$

$Y$ = White light
$G$ = Green component
$R$ = Red component
$B$ = Blue component Because of this, the exposure of the black-and-white film to the green component of light from the image 12 may occur approximately five times greater than the exposure to the blue component of light from the image 12 and approximately three times greater than the exposure to the red component of light from the image 12. This is on the assumption that the film has a substantially flat spectral response. Adjustments can be made to accommodate for any changes in the response of the film from a spectrally flat spectral response. Ideally, the exposure process should be linear in transmissivity versus exposure.

The filter 18 is provided with special characteristics when an exposure is being made of the red and blue components in the color film 12. For example, when an exposure is being made to obtain the red components in the color film 12, the spatial filter 18 is provided with a grating comprising a plurality of parallel, equally spaced lines 20 as illustrated in FIG. 2. The lines are disposed in a first direction which is transverse to the direction in which a beam sweeps normally in a television tube. The lines 20 are preferably disposed in a direction to produce signals modulated at a particular frequency such as approximately 3.6 megacycles per second. This is accomplished by the following formula which is obtained from the enlarged representation shown in FIG. 3:

$$f_1 = Kf_{s1} (\cos \phi_1), \text{ where}$$

$f_1$ = the frequency of modulation such as approximately 3.6 megacycles per second;

$f_{s1}$ = the spatial frequency in cycles per inch of the modulations representing the red color;

$K$ = a constant (scan rate in inches/second); and $\phi_1$ = the angle between the lines 20 and the line normal to the scanning direction of the beam, as shown in FIG. 3.

When an exposure is being made to obtain the blue components in the color film 12, the spatial filter 18 is provided with a grating comprising a plurality of parallel, equally spaced lines 22 as indicated in FIG. 2. The lines 22 are disposed in a direction transverse to the lines 20 and also transverse to the scanning direction. The lines are disposed in an angular direction so that the modulation frequency will be the same as that provided by the lines 20 but the phase relationship will be different for succeeding horizontal scans.

The production of signals modulated to the same particular frequency such as approximately 3.6 megacycles per second may be seen from the following equation:

$$f_2 = Kf_{s2}(\cos \phi_2), \text{ where}$$

$s2$ s2 = the spatial frequency in cycles per inch of the modulations representing the blue color;

$f_2$ = the frequency of modulation such as approximately 3.6 megacycles per second; and $\phi_2$ = the angle between the lines 22 and the line normal to the scanning direction of the beam, as shown in FIG. 3.

$K$ = scan velocity (inches/sec).

The lines 20 are equidistant to the lines 22 in the direction of scan and, as indicated above, the modulating frequency produced by the lines 20 is equal to the modulating frequency produced by the lines 22. For example, the lines 22 may produce modulating signals for the color blue and the lines 20 may produce modulating signals for the color red. As will be described subsequently, the modulating signals for the color blue may have a first phase relationship in successive lines of sweep and the modulating signals for the color red may have a second phase relationship in successive lines of sweep. For example, the modulating signals for the color blue may have a first phase relationship wherein the signals are advanced 90° in successive lines of sweep and the modulating signals for the color red may have a second phase relationship wherein the signals are retarded 90° in successive lines of sweep.

The formation of the composite image on the black-and-white film 10 is illustrated schematically in FIG. 2. The first exposure is made through a red filter and the lines 20 are provided on the spatial filter 18 to modulate the exposure so that a resultant image 24 is formed. The second exposure is made through a blue filter and the lines 22 are provided on the spatial filter to modulate the exposure so that a resultant image 26 is formed. The lines 22 are provided with a different angular or directional orientation than the lines 20. The third exposure is made through a green filter without any modulation so that a resultant image 28 is formed. Since the first, second and third exposures are made on the same film, a composite image 30 is produced on the film.

The composite image 30 is processed by the circuitry shown in FIG. 4 to reproduce the color image on the film 12. The composite image is scanned by a flying spot scanner or image tube in a well-known manner to produce at each instant signals having characteristics representing the composite image 30. The signals are amplified as at 104 and 106 and are isolated by an emitter follower 108 to produce signals which represent the luminance of the color image in the film 12. These signals are applied to the cathode of a cathode ray tube 162 in a conventional television receiver 164 in a manner similar to the normal introduction of the luminance signals in a television receiver.

The signals from the emitter follower 112 are band-passed by a filter 114 constructed to pass signals in a suitable frequency range such as approximately 3.6 megacycles. The signals passing through the filter 114 are delayed by a delay line 115 for a period of time corresponding to that required for the scan beam to move from one point to the point on the next horizontal scan that is on a line which is orthogonal to the scan direction and which connects the two points. The signals are then further delayed by a trimmer delay line 116 to compensate for delay introduced by the other branch. The output of the delay line 116 is coupled to an inverter 117 to invert the signals. The signals from the inverter 117 are then introduced to one terminal of an adder 120. The output of the adder 120 is designated as line 122.

In addition to driving the delay line 115, the signals from the filter 114 are also introduced to a 90° phase shifter 118 and then to a tapped delay line 119. The outputs from the tapped delay line are coupled to an adder 124 as well as the adder 120. The adder 124 also has as an input the output of the delay line 116. The output of the adder 124 is designated as line 126.

As can be seen in FIG. 4, the blue and red vectors may be assumed to be 180° out of phase at the input to the delay line 115 and to the phase shifter 118. The blue vector is rotating in the clockwise direction and the red vector is rotating in the counter-clockwise direction. The delay line 115 provides a delay of one horizontal line scan and the output of the delay line 115 has the red and blue vectors in phase. The output of the 90° phase shifter 118 is rotated 90° and the red and blue vectors are 180° out of phase. Ignoring for the moment the delay line 116 and the tapped delay line 119, the output from the delay line 115 is inverted by the inverter 117 and added to the output from the phase shifter 118 by the adder 120 to produce the blue signal on the line 122. The output from the delay line 115 is added to the output from the phase shifter 118 by the adder 124 to produce the red signal on the line 126.

The signal frequency color coding method described above suffers from luminance transients being introduced into the chrominance channels. When using the angular relationship of the color grating described above, an optical beat occurs every fourth adjacent scan line along a vertical edge in the picture. This can be seen since at certain points along a vertical edge in the picture, the color grating crosses the edge out of phase with the transient signal. When there is a rapid intensity change, ringing is produced which causes a false chrominance signal. When the intensity transient signal (pulse chrominance signal) is in phase with the color grating, a blob of color will be produced that is of greater intensity than it should be for the scene being scanned. When the intensity transient signal is out of phase with the color grating, this cancels the chrominance signal and causes the color to be less than it should be for the scene being scanned. The overall effect is to produce a serrated edge in the chrominance following an edge in the luminance. This is most critical following a rapid black-to-white transition.

Since the color resolution in television receivers is currently limited to approximately 500 kilocycles, and since the chrominance frequency is 3.6 megacycles, it is possible to demodulate the color signals over a number of cycles without reducing the chrominance bandwidth. Specifically, the rise time for a typical chroma signal response is approximately equal to 1 microsecond and each cycle for a modulation of 3.6 megacycles is approximately equal to 280 nanoseconds. It is, therefore, possible to have three-cycle averaging without loss of resolution.

The averaging of the color signals is accomplished using the tapped delay line 119 which is tapped at one cycle intervals. The delay line 115 must be lengthened by $n/2f$ using the delay line 116, where $n$ is the number of cycles averaged over and $f$ is the frequency of modulation, so as to compensate for the added delay produced by the tapped delay line 119.

An intensity transient coming out of the delay line 115 will sum with a signal which has been averaged over three cycles so that a direct beat between luminance and chrominance is reduced by averaging this beat over three cycles. The tapped delay line 119 may be positioned as shown in FIG. 2 or may be in other positions such as after the delay line 115. In addition to the improvement of reducing luminance/chrominance crosstalk, the use of the tapped delay line will also provide a general improvement in color smoothness.

The signals representing the color blue on the line 122 are introduced to the amplifier 128. The gain of the signals representing the color blue are adjustable to provide a proper relationship between the intensity of the color blue and the intensity of the colors red and green. This is indicated by an adjustable potentiometer 132. The signals from the amplifier 128 are then detected by a full wave rectifier-detector 134 and are subsequently smoothed by the detector filter 136. The detected signal passes to the color difference amplifier 138.

The signals representing the color red on the line 126 are increased in amplitude by an amplifier 130. The gain of the signals representing the color red are adjustable to provide a proper relationship between the intensity of the color red and the intensity of the colors blue and green. This is indicated by an adjustable potentiometer 140. The signals from the amplifier 130 are then detected by a full-wave rectifier-detector 142 corresponding to the rectifier-detector 134. The signals are subsequently smoothed by a detector-filter 144 corresponding to the filter 136. The detected signal then passes to the color difference amplifier 146.

The luminance signal is inverted by the amplifier 104 and delayed by the constant delay low pass filter 150. The filter 150 limits the bandwidth of the intensity or luminance signal ($-Y$) to equal the bandwidth (risetime) of the two demodulated color signals; the bandwidth of the two demodulated colors is limited by the detector filters. The signals are then introduced to a delay line 152. This delay line provides a delay corresponding to that provided in the chrominance channels discussed in the previous two paragraphs. The signals are then buffered by an emitter follower 154 through a potentiometer 156 to adjust the gain for a proper value of $-Y$.

The signals from the emitter follower 154 are added to the signals from the detector filter 136 and are amplified by the color difference amplifier 138 to produce signals representing the $B-Y$ component. Similarly, the signals from the emitter follower 154 are added to the signals from the filter detector 144 and are amplified by the color difference amplifier 146 to produce signals representing the $R-Y$ component. The signals representing the $R-Y$ and $B-Y$ components are added in the proper relationship in the matrix network 160 and are inverted to produce the $G-Y$ component. The signals representing the $R-Y$, and $B-Y$ and $G-Y$ components are applied to the grids of the cathode ray tube 162 in a television receiver 164 and the signal representing the intensity or luminance $Y$ at the emitter follower 108 is delayed by a delay line 110 which delays the signals from the emitter follower 108 for a period of time corresponding to the delays provided by the filter 114, the delay lines 115 and 116 and the inverter 117, and is applied in delayed form to the cathodes of the television cathode ray tube. The television receiver 164 then reproduces the color image on the face of the cathode ray tube in the color television receiver.

In FIG. 4*a* an alternative to the dotted portion of the circuit of FIG. 4 is shown. Similar elements are given the same reference characters. The basic difference between FIG. 4 and FIG. 4*a* is that in FIG. 4*a* the signal is passed through the tapped delay line 119 and a summing network 166 before the demodulator circuitry rather than passing through only one leg of the demodulator circuitry as with the circuit of FIG. 4. The tapped delay line 119 of FIG. 4*a* in combination with a high pass filter formed by capacitors 168 and 170 exhibits a bandpass characteristic similar to that provided by the bandpass filter 114 of FIG. 4. Element 116 is no longer necessary since the delay is introduced before the demodulator circuitry.

The circuit of FIG. 4*a* therefore eliminates the need for the bandpass filter 114, which would be somewhat complex. Also, the circuit of FIG. 4*a* provides more uniform averaging in the demodulator in that both signals from the present and previous line are average and before demodulation rather than just one as with the circuit of FIG. 4.

The discussion above has proceeded on the basis of converting a color image such as a color photograph to a composite image on a black-and-white photograph and then operating upon the composite image to reproduce the color image. It will be appreciated, however, that a live scene may also be scanned by systems within the scope of this invention to produce modulated signals representing the live scene. Such systems use gratings somewhat similar to those shown in FIG. 3.

FIG. 5 illustrates a grating which may be used when live scenes are to be scanned. The grating includes filter lines 200 having a yellow color transmission to pass all signal components in the color image except the color blue. The grating further includes filter lines 202 having a cyan color transmission to pass all signal components in the color image except the color red. The relative disposition of the filter lines 200 and 202 may correspond to the embodiment shown in FIG. 3 when the signals produced by the lines 200 and 202 are to have different phases.

The grating shown in FIG. 5 is included as a color modulator 204 in the system schematically shown in FIG. 6. This system includes a lens 210 for focusing the image of the live scene on the modulator 204. The image on the modulator 204 is then focused by a lens 212 on a color camera 214.

The signals produced by the tube 214 in the camera may be transmitted to a position removed from the camera. The signals are then processed by a system corresponding to that shown in FIG. 4 to reproduce the color image.

FIGS. 7 and 8 illustrate a modification of the system shown in FIG. 6. In the system of FIGS. 7 and 8, the grating or color modulator 204 of FIG. 6 is disposed in contiguous relationship to the face of the color camera tube 214. A fiber optic faceplate 216 may be required to maintain resolution of the grating on the photosensitive surface 218 of the tube 214. By disposing the color modulator 204 in contact with the fiber optic faceplate, the lens 212 can be eliminated. It will be appreciated that the grating or color modulator 204 can be disposed adjacent the color image instead of imaging a live scene onto the grating as shown in FIGS. 7 and 8.

In the embodiment shown in FIG. 9, a conventional photographic camera 250 is shown for producing the composite images shown in FIG. 2. The camera shown in FIG. 9 has a grating 252 at the film plane corresponding to the grating or modulator 204 shown in FIG. 6. As an alternative, the grating or modulator 252 may be disposed adjacent the color image.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a system for reproducing a color image from composite signals having signal components formed from spatial modulations of a first color in a first line pattern and spatial modulations of a second color in a second line pattern having a directional orientation different from the first line pattern and with the spatial modulations of the first and second colors at the same frequency and wherein the composite signals are formed from a scanning of the image in successive lines.

means for operating upon the signals representing the composite image to recover from such signals the signal components representing first and second adjacent lines of scan, means for averaging the signal components over a plurality of cycles of modulation in at least one of the first and second lines of scan, and means for operating upon the signal components representing the first and second lines of scan and including the averaged line of scan to obtain a reproduction of the first and second colors with a reducing of luminance/chrominance crosstalk.

2. The system of claim 1 wherein the means for averaging the signal components over a plurality of cycles of modulation includes a delay line tapped at one cycle intervals.

3. The system of claim 1 wherein the signal components are averaged over three cycles.

4. The system of Claim 1 wherein both of the first and second adjacent lines of scan are averaged over a plurality of cycles of modulation.

5. In a system for reproducing a color image from composite signals having signal components formed from spatial modulations of a first color in a first line pattern and spatial modulations of a second color in a second line pattern having a different angular relationship from the first line patterns where the composite signals represent periodic phase relationships between the two modulators in first and second successive line intervals taken in a direction different from either modulator;

means responsive to the composite signals representing at least one of the first and second successive line intervals for averaging the composite signals over a plurality of cycles of modulation in the one line interval;

electronic means responsive to the relative phase of the composite signals representing at least one averaged line and the other line forming the successive line intervals of the composite image to recover from such signals the signal component representing the first color;

electronic means responsive to the relative phase of the composite signals representing at least one averaged line and the other line forming the successive line intervals of the composite image to recover from such signals the signal components representing the second color; and means for operating upon the signals representing the first and second colors to obtain a reproduction of the color image.

6. The system of claim 5 wherein the means for averaging the composite signals over the plurality of cycles of modulation includes a delay line tapped at one cycle intervals.

7. The system of claim 6 additionally including a delay line for compensating for the tapped delay line and with the compensating delay line having a delay of $n/2f$ where $n$ is the number of cycles averaged over and $f$ is the frequency of modulation.

8. The system of claim 5 wherein both of the first and second successive line intervals are averaged over a plurality of cycles of modulation.

9. In combination in a system for reproducing a color image from composite signals including signal components of a first color spatially modulated in a first line pattern and signal components of a second color spatially modulated in a second line pattern having a different angular relationship from the first line pattern where the composite signal represents first and second successive line intervals on the composite image and where the signal components produced from the modulations of the first color have a first phase relationship in successive lines of scan and where the signal components produced from the modulations of the second color have a second phase relationship different from the first phase relationship in the successive scan lines;

means for recovering the composite signal in the successive line intervals;

means responsive to the composite signal in the successive line intervals for averaging the composite signal of at least one of the first and second successive line intervals over a plurality of cycles of modulation to form an averaged composite signal;

first means responsive to the averaged composite signal and the composite signal for passing the signal components having the first phase relationship in the successive lines of scan to obtain the recovery of the signal components representing the second color in the color image;

electronic means responsive to the composite signal to produce signal components representing the luminance of the color image;

electronic means responsive to the signal components representing the first and second colors and the luminance to produce signal components representing the third color; and means for operating upon the signal components representing the first, second and third colors and the luminance to reproduce the color image.

10. The system of claim 9 wherein the means for averaging the composite signal over the plurality of cycles of modulation includes a delay line tapped at one cycle intervals.

11. The system of claim 10 additionally including a delay line for compensating for the tapped delay line and with the compensating delay line having a delay of $n/2f$ where $n$ is the number of cycles averaged over and $f$ is the frequency of modulation 12. The system of claim 9 wherein both of the first and second successive line intervals are greased over a plurality of cycles of modulation.

13. In combination in a system for reproducing a color image from a composite image having a first color spatially modulated in a first line pattern and a second color spatially modulated in a second line pattern having a different angular relationship from the first line pattern and where the composite image is obtained from successive lines of scan of the color image and where, when scanned, the modulations of the first color in the successive lines of scan have a different phase relationship from the modulations of the second color in the successive lines of scan;

first means for scanning the composite image in the successive lines of scan to produce signals representing the composite image in the successive lines of scan and having signal components modulated in accordance with the first and second line patterns and representing the first and second colors;

second means responsive to the signals representing the composite image to produce signal components representing the luminance of the color image;

third means responsive to the signals representing the composite image in the successive lines of scan for producing signals representing first and second successive lines of scan and with the signals of at least one of the first and second successive lines averaged over a plurality of cycles of modulation, fourth means responsive to the signals representing the first and second successive lines of scan for operating upon the modulations in the first line pattern in accordance with the first phase relationship in the first and second successive lines of scan to recover the signal components representing the first color;

fifth means responsive to the signals representing the first and second successive lines of scan for operating upon the modulations in the second line pattern in accordance with the second phase relationship in the first and second successive lines of scan to recover the signal components representing the second color; and sixth means responsive to the signal components representing the first and second colors and the luminance for reproducing the color image.

14. The system of claim 13 wherein the third means includes a tapped delay line providing a plurality of outputs and with a summing of the outputs providing the averaging of at least one of the first and second successive lines over the plurality of cycles of modulation.

15. The system of claim 14 additionally including a compensation delay line for delaying the other of the first and second successive lines for a period to compensate for the tapped delay line and with the compensating delay line having a delay of $n/2f$ where $n$ is the number of cycles averaged over and $f$ is the frequency of modulation.

16. A method of producing a composite image of a color image and reproducing the color image from the composite image, including the steps of;

providing first spatial modulations in a first particular line pattern to represent a first particular color;

providing second spatial modulations in a second particular line pattern having a directional orientation different from the first particular line pattern to represent a second particular color;

exposing the color image on a black-and-white medium with the first and second modulations;

scanning the composite image in successive lines of scan to produce signals representing the composite image in successive lines of scan and having signal components modulated in accordance with the first and second line patterns and representing the first and second particular colors;

operating upon the signals representing the composite image to recover the signals representing a first line of scan;

operating upon the signals representing the composite image to recover the signals representing a second successive line of scan;

operating upon the signals representing the first and second successive lines of scan to average the signals of at least one of the first and second successive lines of scan over a plurality of cycles of modulation;

operating upon the signals representing the one averaged line of scan and the other line of scan to recover the signal components representing the first particular color;

operating upon the signal representing the one averaged line of scan and the other line of scan to recover the signal components representing the second particular color;

operating upon the signals representing the composite image in successive lines of scan to produce signal components representing the luminance of the color image; and operating upon the signal components representing the first and second particular colors and the luminance to reproduce the color image.

17. The method of claim 16 wherein the step of averaging the signals over a plurality of cycles of modulation includes summing a plurality of outputs from a tapped delay line.

18. The method of claim 17 additionally including the step of compensation for the delay provided by the tapped delay line.

19. In a method of producing a composite image of a color image and reproducing the composite image from the color image wherein the color image is scanned in successive lines to produce composite signals representing the color image and wherein the composite signals are produced by first and second filters which are provided in first and second particular line patterns to control the passage of modulated signals representing first and second particular colors in accordance with the first and second particular line patterns, including the steps of:

operating upon the composite signals to recover the modulated signals representing a first line of scan;

operating upon the composite signal to recover the modulated signals representing a second successive line of scan;

operating upon the modulated signals representing one of the first and second lines of scan to average the modulated signals of the one line of scan over a plurality of cycles of modulation;

operating upon the modulated signals of the one averaged line of scan and the other line of scan to recover the signals representing the first color;

operating upon the modulated signals of the one averaged line of scan and the other line of scan to recover the signals representing the second particular color;

operating upon the signals representing the composite image to produce signals representing the luminance of the color image;

operating upon the signals representing the first and second particular colors and the luminance to reproduce the color image.

20. The method of claim 19 wherein the step of averaging the modulated signals over a plurality of cycles of modulation includes summing a plurality of outputs from a tapped delay line.

21. The method of claim 20 additionally including the step of compensating for the delay provided by the tapped delay line.

22 In a method of producing a composite image of a color image and reproducing the composite image from the color image wherein the color image is scanned in successive lines to produce composite signals representing the color image and wherein the composite signals are produced by first and second filters which are provided in first and second particular line patterns to control the passage of modulated signals representing first and second particular colors in accordance with the first and second particular line patterns, including the steps of:

operating upon the composite signals to average the modulated signals over a plurality of cycles of modulations, operating upon the composite signal to recover the modulated signals representing first averaged line of scan;

operating upon the composite signal to recover the modulated signals representing a second successive averaged line of scan;

operating upon the modulated signals of the first averaged line of scan and the second averaged line of scan to recover the signals representing the first color;

operating upon the modulated signals of the first averaged line of scan and the second averaged line of scan to recover the signals representing the second particular color;

operating upon the signals representing the composite image to produce signals representing the luminance of the color image;

operating upon the signals representing the first and second particular colors and the luminance to reproduce the color image.

23. The method of claim 22 wherein the step of averaging the signals over a plurality of cycles of modulation includes summing a plurality of outputs from a tapped delay line.

* * * * *